(12) United States Patent
Suzuki (10) Patent No.: US 6,575,035 B2
(45) Date of Patent: Jun. 10, 2003

(54) APPARATUS AND METHOD FOR MEASURING INTERNAL STRESS OF RETICLE MEMBRANE

(75) Inventor: Yoshihiko Suzuki, Chiyoda-ku (JP)

(73) Assignee: Nikon Corporation, Tokyo (JP)

( * ) Notice: Subject to any disclaimer, the term of this patent is extended or adjusted under 35 U.S.C. 154(b) by 133 days.

(21) Appl. No.: 09/813,030

(22) Filed: Mar. 21, 2001

(65) Prior Publication Data

US 2002/0020220 A1 Feb. 21, 2002

(30) Foreign Application Priority Data

Mar. 21, 2000 (JP) .................................... 2000-078675

(51) Int. Cl.[7] ............................................. G01N 29/04
(52) U.S. Cl. ............................... 73/579; 73/597; 73/602
(58) Field of Search .......................... 73/579, 649, 653, 73/659, 432.1, 597, 600, 602, 800; 356/458, 484, 485; 374/45, 53

(56) References Cited

U.S. PATENT DOCUMENTS

| | | | | |
|---|---|---|---|---|
| 3,887,937 A | * | 6/1975 | Gatos et al. ............. | 250/231.1 |
| 4,011,745 A | * | 3/1977 | Gatos et al. ............ | 257/29.324 |
| 4,521,118 A | * | 6/1985 | Rosencwaig ................. | 356/43 |
| 5,587,532 A | * | 12/1996 | Rose ............................ | 73/571 |
| 5,979,244 A | * | 11/1999 | Michaelis ..................... | 73/800 |
| 6,057,927 A | * | 5/2000 | Levesque et al. ............ | 356/432 |
| 6,125,706 A | * | 10/2000 | Buttram et al. ................ | 73/643 |
| 6,240,784 B1 | * | 6/2001 | Koike et al. ................... | 73/597 |
| 6,360,606 B2 | * | 3/2002 | Hirota et al. .................. | 73/579 |
| 6,397,680 B1 | * | 6/2002 | Levesque et al. ............. | 73/602 |

OTHER PUBLICATIONS

US 2002/0131036 A1, Devices and methods for measuring residual stress in a membrane region of a segmented reticle blank, Sep. 19, 2002.*

* cited by examiner

Primary Examiner—Helen Kwok
Assistant Examiner—Jacques Saint-Surin
(74) Attorney, Agent, or Firm—Oblon, Spivak, McClelland, Maier & Neustadt, P.C.

(57) ABSTRACT

An apparatus for measuring internal stress of a membrane formed in a reticle, including a temperature adjustment device configured to change a temperature of the membrane from a first temperature to a second temperature; a resonance frequency finding device configured to find a first resonance frequency of the membrane at the first temperature and a second resonance frequency of the membrane at the second temperature; and a stress calculating device configured to calculate the internal stress based on the first and second resonance frequencies.

30 Claims, 6 Drawing Sheets

APPARATUS AND METHOD FOR MEASURING INTERNAL STRESS OF RETICLE MEMBRANE

CROSS-REFERENCE TO RELATED APPLICATIONS

The present application claims priority to Japanese Patent Application No. 2000-078675, filed Mar. 21, 2000, entitled "Method for Measuring Internal Stress of Reticle Membrane and Device Therefor, and Method for Manufacturing Semiconductor Device". The contents of that application are incorporated herein by reference in their entirety.

BACKGROUND OF THE INVENTION

1. Field of the Invention

The present invention relates to an apparatus and method for measuring the internal stress of a membrane formed in a reticle. Further, the present invention relates to a method for manufacturing a semiconductor.

2. Discussion of the Background

As semiconductors are becoming more highly integrated, integrated circuits are required to be further detailed and miniaturized. At the same time, in order to print a more detailed and smaller pattern, an exposure device capable of printing at a higher resolution is needed. In response to such demand, an exposure device utilizing a charged particle beam such as an electron beam has been attracting attention.

Among various charged particle beam exposure devices, an exposure device which utilizes a multi-segment exposure transfer method has good throughput and is becoming a mainstream. In this type of exposure devices, a pattern to be formed on one chip is segmented into small transfer regions called "sub-fields" which are usually about 250 $\mu$m×250 $\mu$m each on a wafer. Each sub-field is exposed respectively, and thus the pattern for the one chip is formed on a wafer in its entirety by stitching all the sub-fields on the wafer.

A reticle for the multi-segment exposure method has a number of thin membranes supported by strut portions. For example, when a pattern is transferred by reducing its size to ¼, struts support each membrane having approximately 1 mm×1 mm. Further, in a reticle called a "stencil type", an aperture corresponding to a pattern is formed in its membranes, using the lithography process. When a sub-field is irradiated by a charged particle beam, some charged particles pass through the aperture and form their images on a wafer while the other charged particles are either absorbed or scattered by the membrane and leave no effect on the wafer. Thus, the pattern corresponding to the aperture in the reticle is exposed and transferred onto the wafer.

In forming an aperture corresponding to a pattern in a reticle, the internal stress of its membranes must be considered. If a large internal stress remains in a membrane, an aperture may be deformed due to the internal stress as the aperture is being formed. As a result, the aperture does not have an intended shape.

Consequently, before processing a reticle for apertures, the internal stresses of its membranes are measured, and only reticles with the membranes whose internal stresses are within a permissible range are selected for use.

The internal stresses of the membranes is measured by generating a sound having a certain frequency by a piezoelectric element, oscillating each membrane by the sound, detecting the amplitude of the vibration, finding out a resonance frequency of the membrane, and calculating the internal stress of the membrane based on the resonance frequency thus found. The amplitude of the vibration is detected by using a light lever formed by a multi-segment photo detector and a laser such as a semiconductor laser.

However, to calculate the internal stress of a membrane based on a resonance frequency found in the manner described above, it is necessary to know beforehand what Young's modulus of the membrane is. Hence, by using some other methods or processes, it is necessary to measure Young's modulus of the membrane in advance. For example, the Bulge method and the vibration lead method have been used to measure Young's modulus of a membrane. In the Bulge method, a membrane is pressurized without moving it, and bulging of the membrane is measured. In the vibration lead method, a resonance frequency is measured by preparing a cantilever. As a consequence, a measurement of the internal stress of a membrane requires to use a number of measuring devices and prepare a number of data. The conventional methods for measuring the internal stress of a membrane therefore result in onerous and time consuming processes.

SUMMARY OF THE INVENTION

According to one aspect of the present invention, an apparatus for measuring internal stress of a membrane formed in a reticle includes a temperature adjustment device, a resonance frequency finding device and a stress calculating device. The temperature adjustment device is configured to change a temperature of the membrane from a first temperature to a second temperature. The resonance frequency finding device is configured to find a first resonance frequency of the membrane at the first temperature and a second resonance frequency of the membrane at the second temperature. The stress calculating device is configured to calculate the internal stress based on the first and second resonance frequencies.

According to another aspect of the present invention, a method for manufacturing a semiconductor includes changing a temperature of the membrane formed in a reticle among a plurality of reticles from a first temperature to a second temperature. A first resonance frequency of the membrane at the first temperature and a second resonance frequency of the membrane at the second temperature are found. The internal stress is calculated based on the first and second resonance frequencies. A reticle in which the internal stress of the membrane is within a predetermined range is selected among the plurality of reticles. A pattern is formed on the selected reticle. The pattern formed on the reticle is transferred onto a wafer.

According to yet another aspect of the present invention, a computer readable media for controlling a computer to perform the steps of changing a temperature of the membrane from a first temperature to a second temperature; finding a first resonance frequency of the membrane at the first temperature and a second resonance frequency of the membrane at the second temperature; and calculating the internal stress based on the first and second resonance frequencies.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The preferred embodiments will now be described with reference to the accompanying drawings, wherein like reference numerals designate corresponding or identical elements throughout the various drawings.

Figure 1:
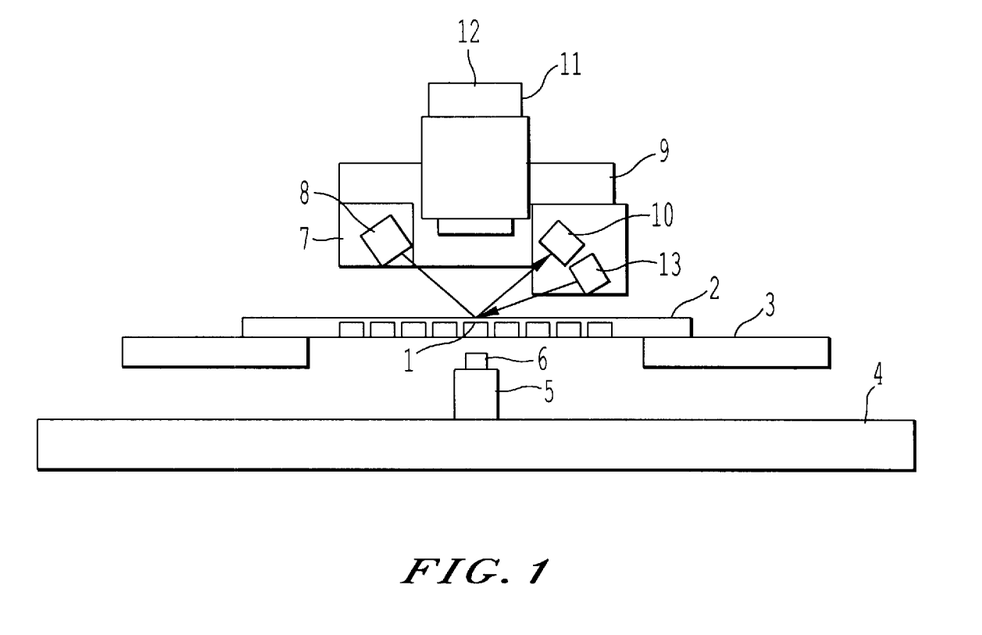
FIG. 1 is an elevational view of a main portion of a device for measuring the internal stress of a reticle membrane according to one embodiment of the present invention.

FIG. 1 illustrates a main portion of a device for measuring the internal stress of a reticle membrane according to one embodiment of the present invention. Referring to FIG. 1, a reticle 2 which has a plurality of thin membranes 1 is positioned on a stage 3 having an opening. Facing the bottom surface of the reticle 2, a PZT element 6 is provided on a movable stage 5 and the movable stage 5 is provided on a base 4. The distance between the thin membranes 1 and the PZT element 6 is set at any suitable distance. Preferably, the distance is, for example, in a range of about 1.5 mm to 5.0 mm. The PZT element 6 is configured to vibrate the membrane 1 via a gas. For example, in the present embodiment, the gas is an air. The PZT element 6 is configured to vibrate the membrane 1 as the PZT element 6 changes the vibration frequency of the membrane 1.

A laser diode 8 which is positioned on a first positioning unit 7 emits a laser beam upon the thin membranes 1 at a suitable incident angle. For example, the incident angle may be approximately 20°. Subsequently, a multi-segment photo diode 10 which is positioned on a second positioning unit 9 receives the laser beam which is reflected by the thin membranes 1. As such, an optical lever is formed and utilized to measure a vibration of the thin membranes 1.

An optical observation unit 11 permits observation of a membrane 1 being evaluated and a CCD 12 integrated in the optical observation unit 11 permits the membrane 1 to be monitored. The observation unit 11 reads alignment marks on the reticle 2 and determines a location to be measured in the reticle 2.

A heat laser 13 is used to change the temperature of the membranes 1. For example, a membrane 1 being measured may be irradiated by the heat laser 13 in order to obtain a certain temperature increase from a first temperature to a second temperature.

Figure 2:
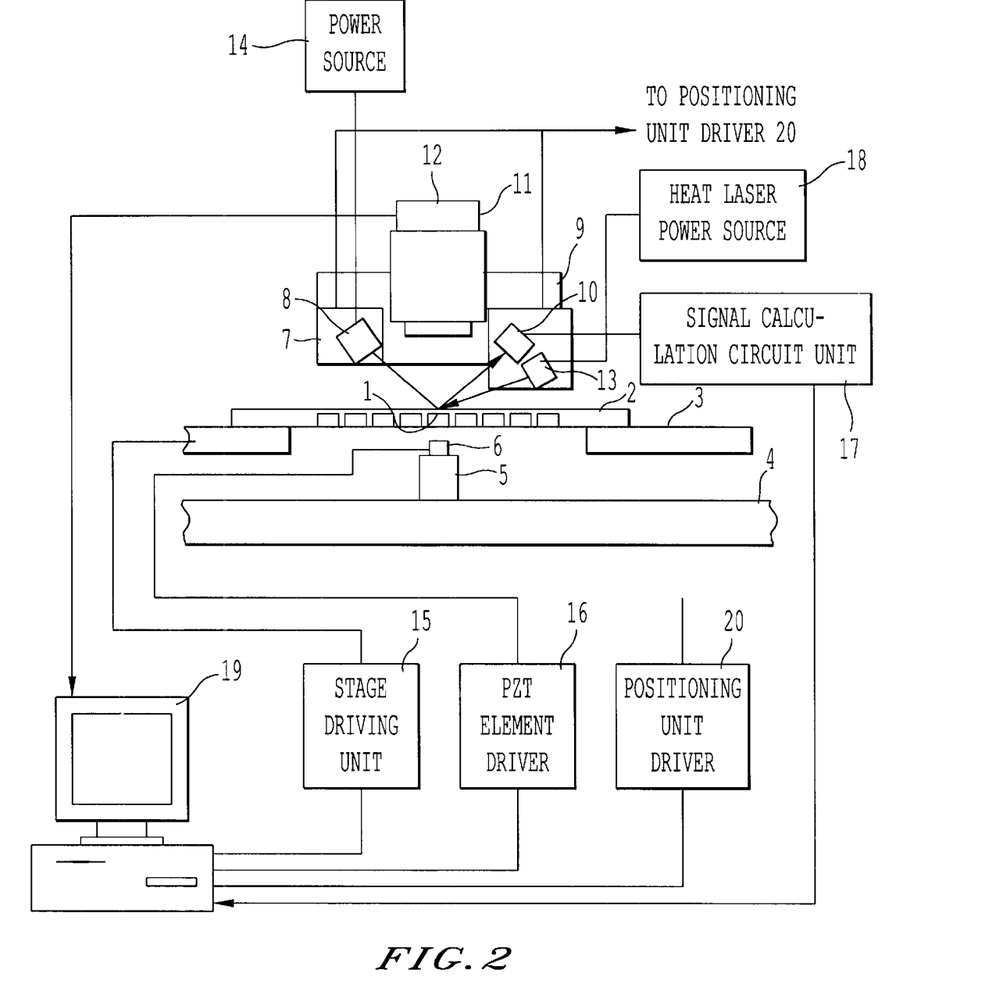
FIG. 2 is a schematic illustration of the entire device shown in FIG. 1.

FIG. 2 is a schematic illustration of the entire device a part of which is shown in FIG. 1. Referring to FIG. 2, the reticle 2 is held in a magazine capable of holding a plurality of reticles and then the magazine is set on the apparatus. The reticle 2 is set upon the stage 3 from the magazine. If there is a reticle 2 on the stage 3 which has been already measured, the measured reticle 2 is moved from the stage 3 to another magazine for storing measured reticles after measurement. Then, a next reticle 2 to be measured is set upon the stage 3.

Once the reticle 2 is set upon the stage 3, the reticle 2 is prealigned based on, for example, notches or orientation flats provided in the reticle 2, and the reticle 2 is thus approximately positioned according to its inner surface. Then, an auto-focus mechanism which uses the optical observation unit 11 adjusts the height of the optical lever which includes the semiconductor laser 8 and the multi-segment photo diode 10 with respect to the reticle 2.

The internal stress ($\sigma$) of a membrane formed in a reticle can be evaluated based on resonance frequency (f) by using the equation, $$\sigma = k_0 \cdot a \cdot f^2 + k_1 \cdot \{\sqrt{(E \cdot t^3)}/a\} \cdot f + k_2 \cdot (E \cdot t^3)/a^3, \quad (1)$$

wherein ($k_0$, $k_1$ and $k_2$) are constants dependent upon the magnitude of a vibration mode, (a) is a length of one side of the membrane, (E) is Young's modulus and (t) is a thickness of the membrane. Then, the derivative of the equation (1) with respect to (f) is $$d\sigma/df = 2 \cdot k_0 \cdot a \cdot f + k_1 \sqrt{(E \cdot t^3)}/a. \quad (2)$$

When the initial temperature of the membrane is about a room temperature, (d$\sigma$) can be determined based on a temperature increase on the membrane. Hence, a correlation between (d$\sigma$) and the temperature increase of the membrane can be calculated using the finite element method beforehand.

Therefore, by finding out a resonance frequency of the membrane at a certain temperature, for example, a room temperature, in the beginning, and then a resonance frequency of the membrane at a different temperature, (d$\sigma$) may be calculated as described above. In turn, (d$\sigma$/df) may be calculated. Further, by using the resonance frequency at the initial temperature for (f) in the equation (2), Young's modulus (E) may be calculated. Subsequently, the internal stress ($\sigma$) may be calculated from the equation (1), using the Young's modulus (E) previously calculated.

The temperature of the membrane may be measured by using, for example, a non-contact thermometer. However, if a temperature change may be ascertained from a device designed to change temperature, the temperature of the membrane need not be measured, since (d$\sigma$) may be calculated based on the ascertainable temperature change.

In the present embodiment, for instance, the vibrating unit 6 vibrates via air the membrane 1 in the reticle 2 at a first temperature, for example, a room temperature. Then, the amplitude of the vibration of the membrane 1 is measured by the amplitude measuring device. The vibrating unit 6 vibrates the membrane 1 as changing the vibration frequency of the membrane 1. As a result, the resonance frequency finding device finds the resonance frequency of the membrane at the room temperature. Subsequently, the temperature adjustment device 13 changes the temperature of the membrane 1 from the first temperature to a second temperature and a resonance frequency of the membrane at the second temperature is obtained in the same manner just described. Finally, the internal stress calculation device calculates the internal stress of the membrane based on the two resonance frequencies thus obtained according to the method for measuring the internal stress of a membrane described above.

Figure 3:
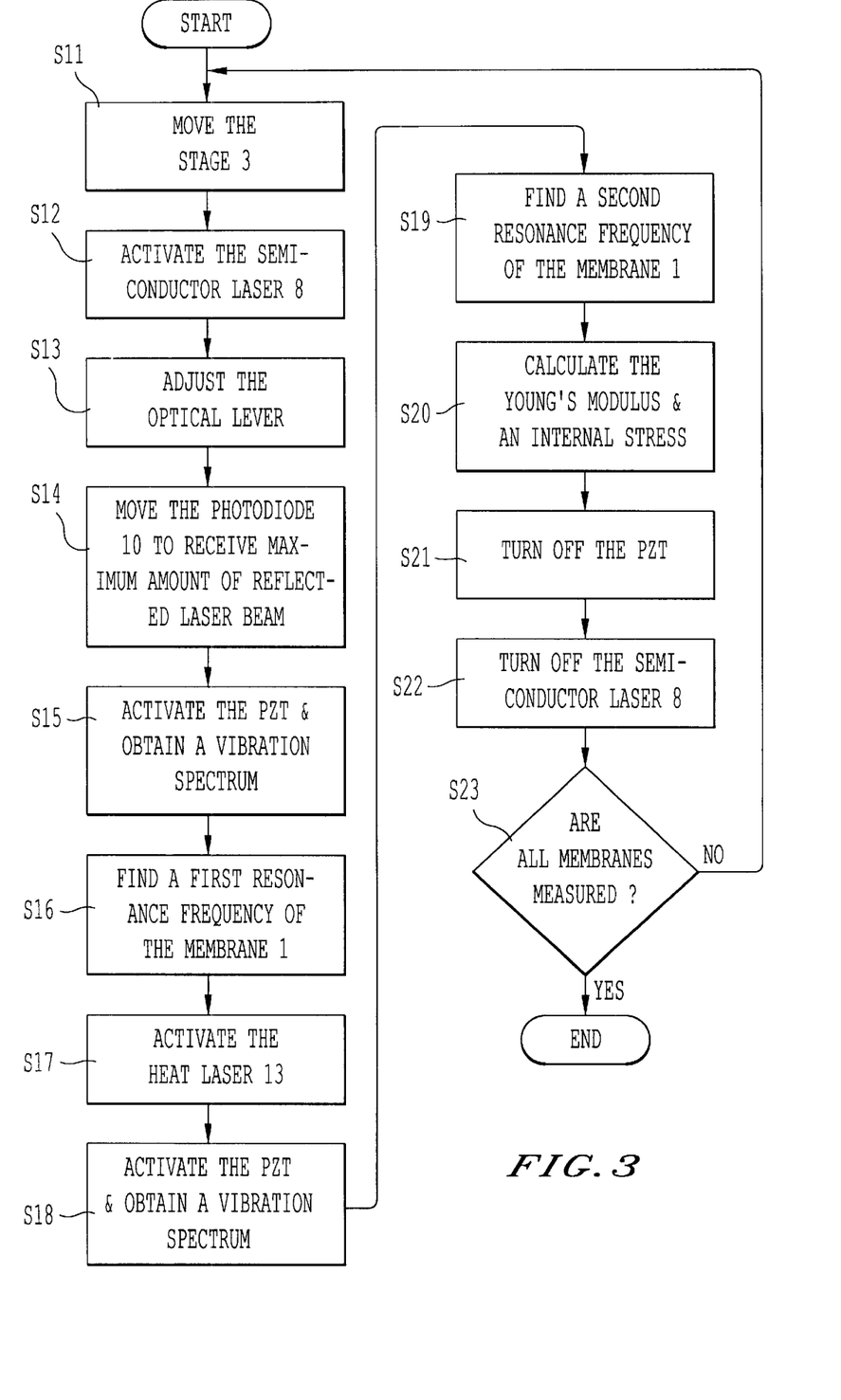
FIG. 3 is a flow chart for measuring internal stress of the reticle membrane according to the device shown in FIG. 2.

FIG. 3 is a flow chart for measuring internal stress of reticle membrane. Referring to FIG. 3, at step (S11), accurate positioning is carried out as the optical observation unit 11 and the CCD 12 read a plurality of alignment marks on the upper surface of the reticle 2 and determine an accurate amount of deviation. At step (S12), the laser diode 8 is activated through a power source 14.

Subsequently, a stage driving unit 15 moves the stage 3 such that the reticle 2 is moved to a measuring position.

Accordingly, a membrane 1 to be measured first is positioned at a measuring position. At step (S13), the optical lever is adjusted in the z-direction by utilizing auto focus. At step (S14), a positioning unit driver 20 activates the second positioning stage 9 to position the multi-segment photo diode 10 to receive the laser beam reflected by the thin membrane 1 at the center of the multi-segment photo diode 10. For the adjustment process just described, a method such as one which searches for a position where the multi-segment photo diode 10 gives an equal output for each element being detected may be used, for example.

Then, at step (S15), by applying AC voltage, a PZT element driver 16 activates the PZT element 6. Thereby, the PZT element 6 generates an acoustic wave having a certain range of frequencies. A vibration amplitude of the membrane 1 obtained at that time is measured through a signal calculation circuit unit 17 as an output by the multi-segment photo diode 10. A vibration spectrum is obtained by carrying out the measurement described above as the frequency varies. At step (S16), from the vibration spectrum, a resonance frequency of the membrane 1 is found.

At step (S17), the heat laser 13 is activated by utilizing a heat laser power source 18. The heat laser 13 irradiates and heat the membrane 1. At steps (S18 and S19), a vibration spectrum and a resonance frequency for the heated membrane 1 are obtained in the same manner as previously described. At step (S20), a control unit 19 calculates a Young's modulus and an internal stress value by utilizing the two resonance frequencies. These results are then stored in the control unit 19. At steps (S21 and S22), finally, the PZT element 6, the semiconductor laser 8 and the heat laser 13 are turned off. At step (S23), it is determined whether the internal stresses of all membranes 1 are measured. All these steps described so far are respectively repeated for other membranes 1. Hence, internal stress values of a plurality of thin membranes 1 may be obtained, respectively.

According to this embodiment of the present invention, the thin membranes 1 are heated from their upper surfaces. However, the thin membranes 1 may be heated from their lower surfaces. Furthermore, a temperature increase in the thin membranes 1 may be calculated from an output of the heat laser 9. Thus, it is not necessary to measure the temperature increase. Nonetheless, if preferred, a thermometer may be used to measure the temperature increase in determining a (dσ) value.

Figure 7:
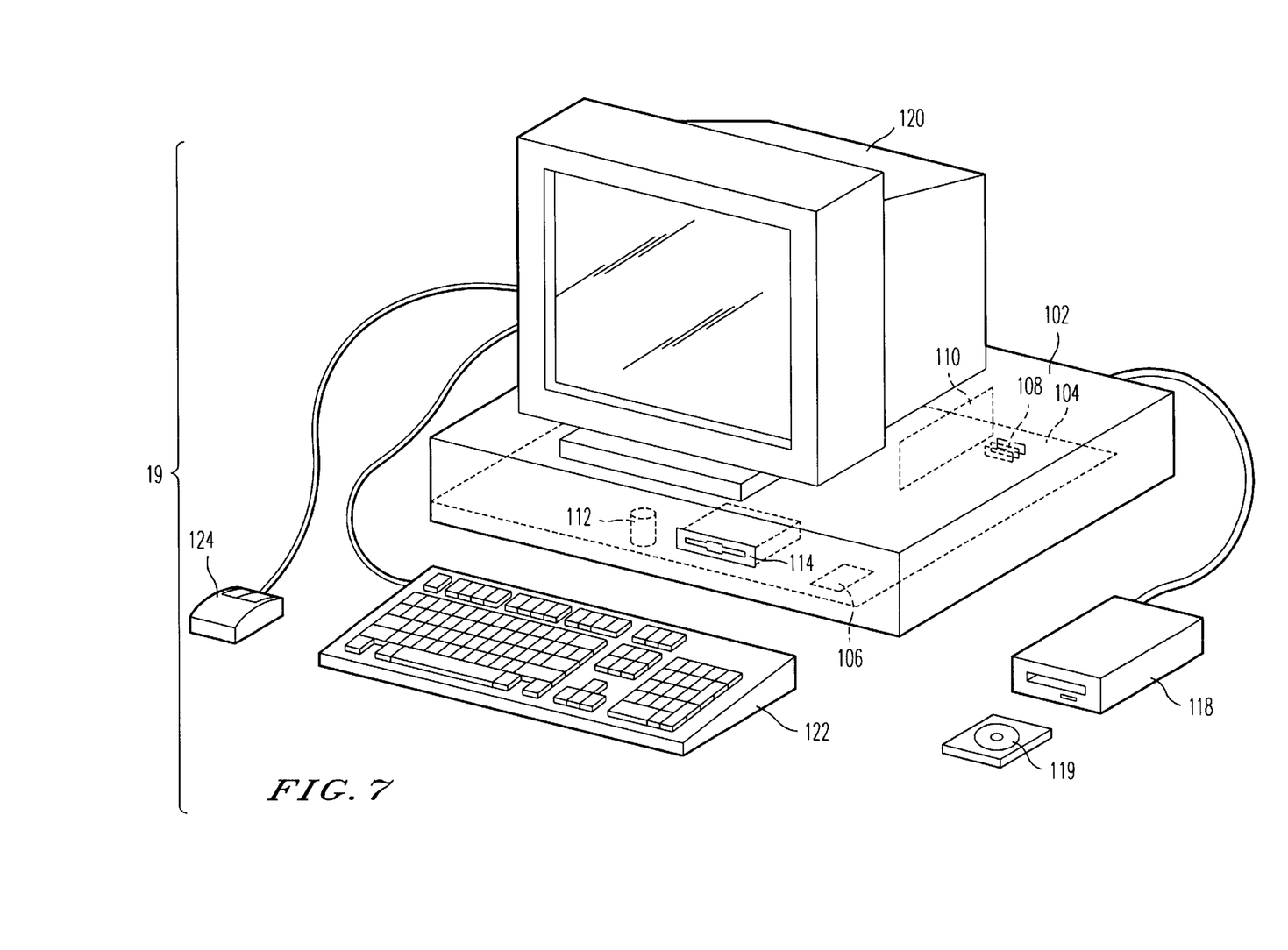
FIG. 7 is a schematic illustration of the control unit.

FIG. 7 is a schematic illustration of the control unit 19. In this embodiment, the control unit 19 is, for example, a computer system. The computer system 19 implements the method of the present embodiment according to the invention, wherein the computer housing 102 houses a motherboard 104 which contains a CPU 106, memory 108 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer system 19 also includes plural input devices, (e.g., a keyboard 122 and mouse 124), and a display card 110 for controlling monitor 120. In addition, the computer system 100 further includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus, an Enhanced IDE bus, or a Ultra DMA bus). Also connected to the same device bus or another device bus, the computer system 19 may additionally include a compact disc reader 118, a compact disc reader/writer unit (not shown) or a compact disc jukebox (not shown). Although compact disc 119 is shown in a CD caddy, the compact disc 119 can be inserted directly into CD-ROM drives which do not require caddies.

As stated above, the system includes at least one computer readable medium. Examples of computer readable media are compact discs 119, hard disks 112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 100 and for enabling the computer 100 to interact with a human user. Such software may include, but is not limited to, device drivers, operating systems and user applications, such as development tools. Such computer readable media further includes the computer program product of the present embodiment according to the invention for changing a temperature of the membrane from a first temperature to a second temperature; finding a first resonance frequency of the membrane at the first temperature and a second resonance frequency of the membrane at the second temperature; and calculating the internal stress based on the first and second resonance frequencies. The computer code devices of the present invention can be any interpreted or executable code mechanism, including but not limited to scripts, interpreters, dynamic link libraries, Java classes, and complete executable programs.

Figure 4:
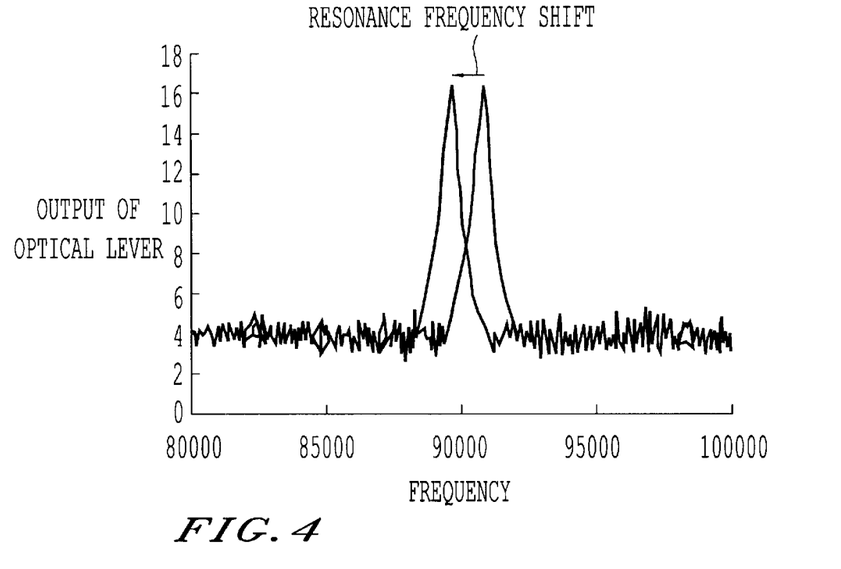
FIG. 4 is a graph of an example of resonance frequency shift which occurs before and after a reticle membrane is heated.

FIG. 4 is a graph of an example of secondary resonance frequency shift. The secondary resonance frequency shifts between before and after a reticle membrane is heated. To obtain this secondary resonance frequency shift, a 1.15 mm×1.15 mm silicon membrane having a thickness of 2 $\mu$m was irradiated with a 5 mW red colored laser beam and gave a temperature increase of approximately 15° C. In the manner described above, a resonance frequency point was measured before and after the silicon membrane was heated by the laser beam. The graph clearly shows that the resonance frequency has been shifted due to the heating. In the membrane having the aforementioned dimension, mathematical evaluation reveals that by an approximately 16° C. temperature increase, a stress may reduce by 6 MPa. Using this correlation, (dσ/df) can be found. Subsequently, the Young's modulus and an internal stress can be calculated at the same time, using the method described above.

In the present embodiment, a thermometer may be used to measure the temperature of the membrane directly. Alternatively, a temperature change may be determined from an output of the laser device 13. In this case, because an increase in the temperature of a membrane can be effectively determined based on an output of the laser device, there is no need for a thermometer to measure the temperature of a membrane.

Further, in the present embodiment, the membrane 1 is heated by irradiating the membrane 1 with a laser beam. Such a laser device 13 increases the freedom in designing the apparatus, since the membrane can be easily heated away from the membrane itself.

In the present embodiment, the vibration generating device is a device which has an oscillator and utilizes a gas as a medium to transmit a vibration of the vibrating unit to a membrane. Such a device can give an even force throughout a membrane since a membrane is vibrated through a gaseous medium. Also, because no mechanical elements in such a device would come in contact with a membrane itself, a membrane is prevented from being damaged.

The amplitude measuring unit includes a light emitter and a position measuring unit for measuring a position of the light after being reflected. The amplitude measuring unit may detect even the amplitude of an extremely small vibration by utilizing a light lever. By using the device designed to utilize a light lever, not only even an extremely small amplitude of vibration can be detected, but also the freedom in designing the apparatus increases because the light emitting unit and the position measuring unit can be positioned away from a membrane. An amplitude of a vibration of the membrane may be detected by measuring a change in capacitance between the membrane and the amplitude measuring unit.

The conventional method for measuring the internal stress of a membrane requires a number of various measuring devices and data, resulting in onerous and time consuming processes. However, according to the embodiment of the present invention, the internal stress of a membrane can be measured by one device.

Although the temperature adjustment device includes a heat laser 13 to heat the membrane 1 in the present embodiment, the temperature adjustment device may include another type of a heater to heat the membrane 1.

Figure 5:
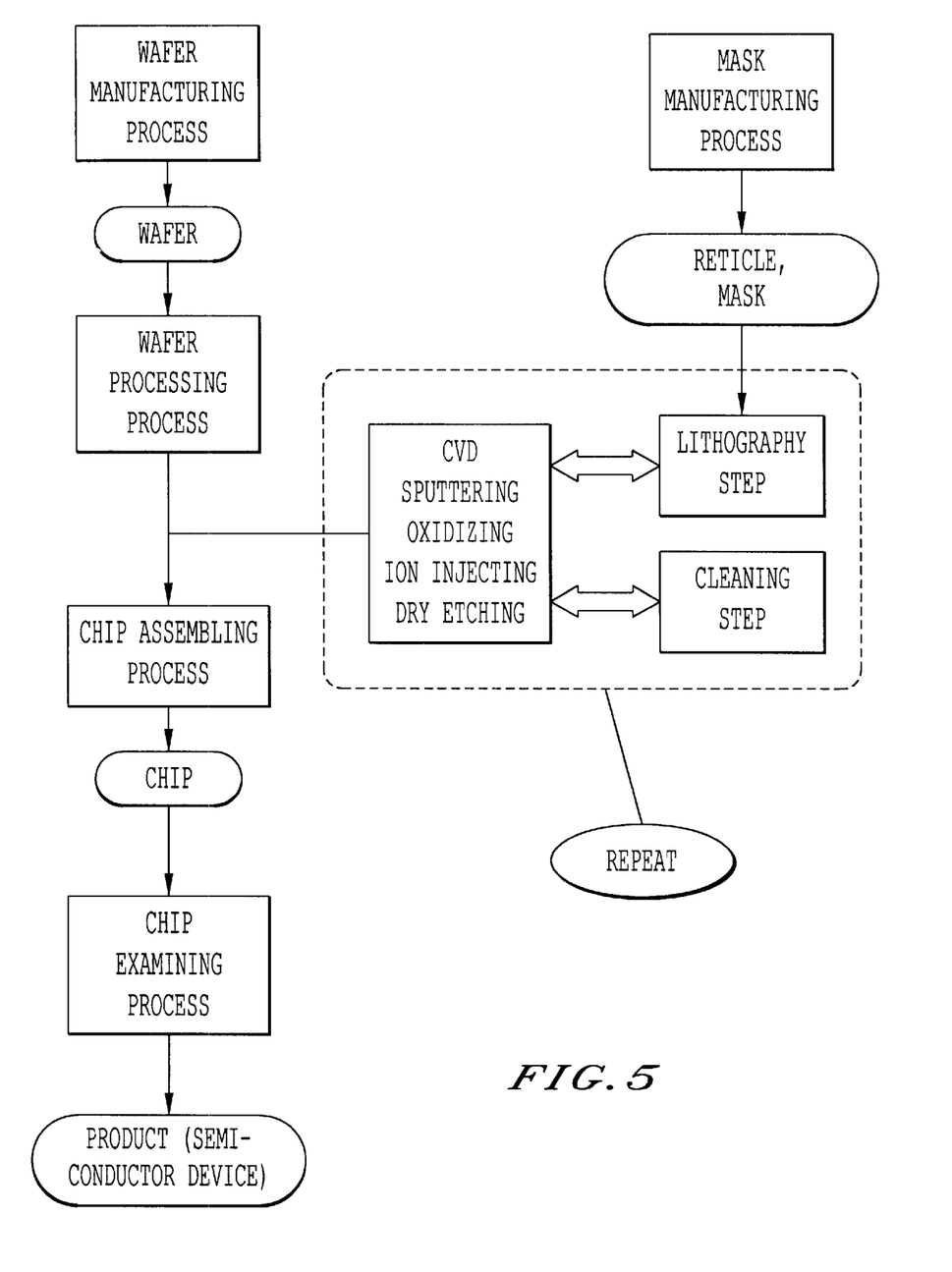
FIG. 5 is a flow chart of a semiconductor device manufacturing process according to one embodiment of the present invention.

FIG. 5 is a flow chart of a semiconductor device manufacturing method according to one embodiment of the present invention. Referring to FIG. 5, for example, the manufacturing method includes main processes as follows:

(1) a wafer manufacturing process during which a wafer is manufactured (or a wafer preparation process during which a wafer is prepared);

(2) a mask manufacturing process during which a mask which is used for an exposure process is manufactured (or a mask preparation process during which a mask is prepared);

(3) a wafer processing process during which a wafer is processed;

(4) a chip assembling process during which chips formed on the wafer are cut out and given functional capability; and (5) a chip examining process during which chips are examined.

Each of the main processes described above includes some steps.

Among the foregoing main processes, the wafer processing process is most critical in determining the capability and performance of a semiconductor. During the wafer processing process, designed circuit patterns are sequentially laid on a wafer in order to produce many chips such as memories and MPUs. For example, the wafer processing process may include steps as follows:

(1) a thin film forming step during which a thin film such as a dielectric film functioning as an insulation layer and a metal film functioning as wires or electrodes;

(2) an oxidizing step during which the thin film and the wafer substrate are oxidized;

(3) a lithography step during which a resist pattern is formed by using a mask, i.e., a reticle, in order to selectively process the thin film and the wafer substrate;

(4) an etching step during which the thin film and wafer substrate are etched according to the resist pattern;

(5) an injecting and diffusing step during which ions are injected and impurities are diffused;

(6) a resist removing step; and (7) an inspection step during which the processed wafer is inspected.

In the wafer processing process, for example, the film forming step may be CVD and sputtering, and the etching step may utilize the dry etching technique. The wafer processing process is repeated as many times as a number of layers required, thereby producing a semiconductor device which performs as designed.

Figure 6:
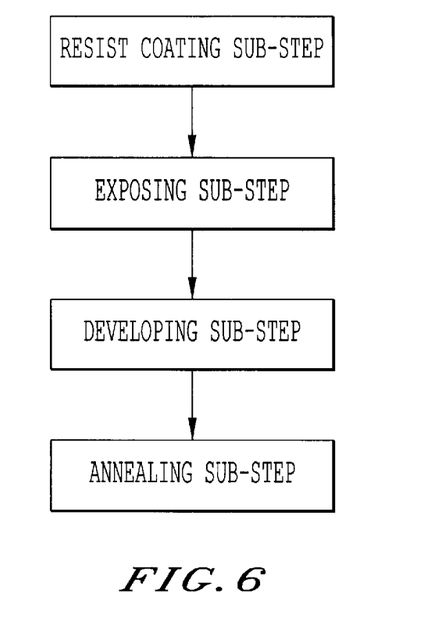
FIG. 6 is a flow chart of the lithography step described in FIG. 5.

FIG. 6 is a flow chart of the lithography step described in FIG. 5. The lithography step is an important step of the wafer processing process. For example, the lithography step may include sub-steps as follows:

(1) a resist coating sub-step during which resist is coated upon the wafer on which a circuit pattern is formed in the previous step;

(2) an exposing sub-step during which the resist is exposed;

(3) a developing sub-step during which the resist pattern is obtained by developing the resist thus exposed; and (4) an annealing sub-step to stabilize the resist pattern thus developed.

In the present embodiment, a method for manufacturing a semiconductor include measuring the internal stress of each membrane in a reticle, selecting a reticle with the membranes whose internal stresses fall within a certain range, forming a pattern on the reticle selected in the selecting step, and transferring the pattern on the reticle to a wafer. The transferring step may be carried out by using the reticle with a charged particle beam exposure device. In this method, the internal stresses of membranes in a reticle can be easily measured, and a cost of manufacturing semiconductor devices can be reduced.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for measuring internal stress of a membrane formed in a reticle, comprising:

a temperature adjustment device configured to change a temperature of the membrane from a first temperature to a second temperature;

a resonance frequency finding device configured to find a first resonance frequency of the membrane at the first temperature and a second resonance frequency of the membrane at the second temperature; and a stress calculating device configured to calculate the internal stress based on the first and second resonance frequencies.

2. An apparatus according to claim 1, wherein the temperature adjustment device comprises a laser emitting unit which is configured to emit laser to the membrane to heat the membrane.

3. An apparatus according to claim 2, wherein the temperature adjustment device comprises a temperature increase calculating unit which is configured to calculate a temperature increase in the membrane based on an output of the laser emitting unit.

4. An apparatus according to claim 1, wherein the temperature adjustment device comprises a temperature detecting unit which is configured to detect the temperature of the membrane.

5. An apparatus according to claim 1, wherein the first temperature is about a room temperature.

6. An apparatus according to claim 1, wherein the resonance frequency finding device comprises:

a vibrating unit configured to vibrate the membrane as changing a vibration frequency of the membrane;

an amplitude measuring unit configured to measure a vibration amplitude of the membrane; and a resonance frequency calculation unit configured to calculate the first and second resonance frequencies based on the vibration frequency of the membrane and the vibration amplitude of the membrane.

7. An apparatus according to claim 6, wherein the vibrating unit is provided to have a gap between the vibrating unit and the reticle and configured to vibrate the membrane via a gas which exists in the gap.

8. An apparatus according to claim 7, wherein the gap is from about 1.5 mm to about 5.0 mm.

9. An apparatus according to claim 6, wherein the amplitude measuring unit comprises:

a light emitter configured to emit light to the membrane; and a light receiver configured to receive the light reflected on the membrane to measure the vibration amplitude of the membrane.

10. An apparatus according to claim 1, wherein the stress calculating device is configured to calculate the internal stress ($\sigma$) based an equation, $$\sigma = k_0 \cdot a \cdot f^2 + k_1 \cdot \{\sqrt{(E \cdot t^3)}/a\} \cdot f + k_2 \cdot (E \cdot t^3)/a^3,$$

wherein ($k_0$, $k_1$ and $k_2$) are constants dependent upon a magnitude of a vibration mode, (a) is a length of one side of the membrane, (f) is a resonance frequency of the membrane, (E) is Young's modulus and (t) is a thickness of the membrane.

11. An apparatus according to claim 10, wherein the stress calculating device is configured to calculate the Young's modulus (E) based on an equation, $$d\sigma/df = 2 \cdot k_0 \cdot a \cdot f + k_1 \sqrt{(E \cdot t^3)}/a.$$

12. An apparatus according to claim 11, wherein the stress calculating device comprises:

an internal stress change finding unit configured to find a stress change in the internal stress according to a temperature change from the first temperature to the second temperature, the stress calculating device being configured to calculate the internal stress based on the stress change and the first and second resonance frequencies.

13. An apparatus according to claim 12, wherein the internal stress change finding unit is configured to find the stress change in the internal stress by utilizing a finite element method.

14. An apparatus according to claim 6, wherein the amplitude measuring unit comprises:

a capacitor detector configured to detect capacity between the membrane and the capacitor detector.

15. A method for measuring internal stress of a membrane formed in a reticle, comprising:

changing a temperature of the membrane from a first temperature to a second temperature;

finding a first resonance frequency of the membrane at the first temperature and a second resonance frequency of the membrane at the second temperature; and calculating the internal stress based on the first and second resonance frequencies.

16. A method according to claim 15, wherein the temperature of the membrane is changed by emitting laser from a laser emitting unit to the membrane to heat the membrane.

17. A method according to claim 16, further comprising:

calculating a temperature increase in the membrane based on an output of the laser emitting unit.

18. A method according to claim 15, wherein the first temperature is about a room temperature.

19. A method according to claim 15, wherein the resonance frequency finding step comprises:

vibrating the membrane as changing a vibration frequency of the membrane;

measuring a vibration amplitude of the membrane; and calculating the first and second resonance frequencies based on the vibration frequency of the membrane and the vibration amplitude of the membrane.

20. A method according to claim 19, wherein a vibrating unit vibrates the membrane via a gas which exists in a gap formed between the vibrating unit and the reticle.

21. A method according to claim 20, wherein the gap is from about 1.5 mm to about 5.0 mm.

22. A method according to claim 19, wherein the vibration amplitude measuring step comprises:

emitting light to the membrane; and receiving the light reflected on the membrane to measure the vibration amplitude of the membrane.

23. A method according to claim 15, wherein the internal stress ($\sigma$) is calculated based an equation, $$\sigma = k_0 \cdot a \cdot f^2 + k_1 \cdot \{\sqrt{(E \cdot t^3)}/a\} \cdot f + k_2 \cdot (E \cdot t^3)/a^3,$$

wherein ($k_0$, $k_1$ and $k_2$) are constants dependent upon a magnitude of a vibration mode, (a) is a length of one side of the membrane, (f) is a resonance frequency of the membrane, (E) is Young's modulus and (t) is a thickness of the membrane.

24. A method according to claim 23, wherein the Young's modulus (E) is calculated based on an equation, $$d\sigma/df = 2 \cdot k_0 \cdot a \cdot f + k_1 \sqrt{(E \cdot t^3)}/a.$$

25. A method according to claim 24, wherein the stress calculating step comprises:

finding a stress change in the internal stress of the membrane according to a temperature change from the first temperature to a second temperature, the internal stress being calculated based on the stress change and the first and second resonance frequencies.

26. A method according to claim 25, wherein the stress change in the internal stress is found by utilizing a finite element method.

27. A method according to claim 15, wherein the steps of claim 14 are performed by a computer.

28. An apparatus for measuring internal stress of a membrane formed in a reticle, comprising:

temperature adjustment means for changing a temperature of the membrane from a first temperature to a second temperature;

resonance frequency finding means for finding a first resonance frequency of the membrane at the first temperature and a second resonance frequency of the membrane at the second temperature; and stress calculating means for calculating the internal stress based on the first and second resonance frequencies.

29. A method for manufacturing a semiconductor, comprising:

changing a temperature of the membrane formed in a reticle among a plurality of reticles from a first temperature to a second temperature;

finding a first resonance frequency of the membrane at the first temperature and a second resonance frequency of the membrane at the second temperature;

calculating the internal stress based on the first and second resonance frequencies;

selecting, among the plurality of reticles, a reticle in which the internal stress of the membrane is within a predetermined range;

forming a pattern on the selected reticle; and transferring the pattern formed on the reticle onto a wafer.

30. A computer readable media for controlling a computer to perform the steps of:

changing a temperature of the membrane from a first temperature to a second temperature;

finding a first resonance frequency of the membrane at the first temperature and a second resonance frequency of the membrane at the second temperature; and calculating the internal stress based on the first and second resonance frequencies.

* * * * *